(12) United States Patent
Watt

(10) Patent No.: US 7,468,728 B2
(45) Date of Patent: Dec. 23, 2008

(54) APPARATUS FOR CONTROLLING A VIRTUAL ENVIRONMENT

(75) Inventor: Mark Alan Watt, Cambridge (GB)

(73) Assignee: Antics Technologies Limited, Cambridge (GB)

(*) Notice: Subject to any disclaimer, the term of this patent is extended or adjusted under 35 U.S.C. 154(b) by 210 days.

(21) Appl. No.: 10/565,343

(22) PCT Filed: Jul. 14, 2004

(86) PCT No.: PCT/GB2004/003049

§ 371 (c)(1),
(2), (4) Date: Jan. 20, 2006

(87) PCT Pub. No.: WO2005/015505

PCT Pub. Date: Feb. 17, 2005

(65) Prior Publication Data

US 2006/0181535 A1 Aug. 17, 2006

Related U.S. Application Data

(60) Provisional application No. 60/504,015, filed on Sep. 19, 2003.

(30) Foreign Application Priority Data

Jul. 22, 2003 (GB) .................................. 0317138.6

(51) Int. Cl.
*G06T 15/00* (2006.01)

(52) U.S. Cl. ....................... 345/473; 345/474; 345/475; 709/204; 709/205; 463/1

(58) Field of Classification Search ......... 345/473–475; 709/204, 205; 463/1
See application file for complete search history.

(56) References Cited

U.S. PATENT DOCUMENTS

| 5,491,743 A | 2/1996 | Shiio et al. .................. 715/759 |
| 5,956,039 A | 9/1999 | Woods et al. ................ 345/419 |
| 6,476,830 B1 | 11/2002 | Farmer et al. ................ 715/706 |

(Continued)

FOREIGN PATENT DOCUMENTS

EP 0 753 836 A2 1/1997

(Continued)

OTHER PUBLICATIONS

Strauss P. S. et al., An Object-Oriented 3D Graphics Toolkit, Copmuter Graphics, Jul. 1, 1992, pp. 341-349, vol. 26, No. 2, Published in: US.

(Continued)

*Primary Examiner*—Phu K Nguyen
(74) *Attorney, Agent, or Firm*—Klein, O'Neill & Singh, LLP

(57) ABSTRACT

An apparatus for controlling an interactive virtual environment is disclosed. The apparatus comprises means for defining a virtual environment populated by objects, the objects comprising at least avatars and props, objects within the virtual environment may be dynamically attached to and detached from other objects under user control. A prop has associated with it an animation for use when an avatar interacts with the prop, and when the prop is attached to another object the animation remains associated with the prop. When an object is attached to another object, it may inherit the movement of the object to which it is attached.

22 Claims, 5 Drawing Sheets

U.S. PATENT DOCUMENTS 7,065,553 B1 * 6/2006 Chesley et al. .............. 709/205
2002/0118197 A1 8/2002 Baraff et al. ................ 345/474

FOREIGN PATENT DOCUMENTS

| WO | WO 98/06043 A1 | 2/1998 |
| WO | WO 99/30494 A1 | 6/1999 |
| WO | WO 01/27880 A1 | 4/2001 |

OTHER PUBLICATIONS

Gaildrat V. et al., Declarative Scenes Modelling With Dynamic Links and Decision Rules Distributed Among the Objects, IFIP Transactions B. Applications in Technology, 1993, pp. 165-178, vol. 9, Publisher: Elsevier Science Publishing, Published in: NL.

Carlsson C. et al., Dive—A Multi-User Virtual Reality System, Virtual Reality Annual International Symposium, Sep. 18, 1993, pp. 394-400, Publisher: IEEE, Published in: US.

Fukuda K. et al., Hypermedia Personal Computer communication System: Fujitsu Habitat, Fujitsu-Scientific and Technical Journal, Oct. 1, 1990, pp. 197-206, vol. 26, No. 3, Publisher: Fujitsu Limited. Kawasaki, Published in: JP.

http://www.maxon.net/pages/products/c4d/modules/thinking_particles/hl_tparticle_01_e.html (Nov. 9, 2002).

http://insidecg.com/feature.php?id=121&page=2 (Jul. 2, 2003) See reference to Thinking Particles module.

http://www.pugh.co.uk/Products/maxon/cinema4Dx18.htm (2001) See reference to Thinking Particles module.

* cited by examiner

APPARATUS FOR CONTROLLING A VIRTUAL ENVIRONMENT

CROSS-REFERENCE TO RELATED APPLICATION

This application claims the benefit, under 35 U.S.C. Section 119(e), of co-pending U.S. provisional application No. 60/504,015, filed Sep. 19, 2003, the disclosure of which is incorporated herein by reference.

FEDERALLY SPONSORED RESEARCH OR DEVELOPMENT

Not Applicable

BACKGROUND OF THE INVENTION

The present invention relates to an apparatus for controlling a virtual environment, and in particular an interactive virtual environment which may be populated by avatars and props. Such an apparatus can be used, for example, as an authoring tool for allowing a user to create and edit animation sequences, or in games.

In conventional computer animation systems, an animator creates a series of movements in a scene frame by frame. Alternatively the animator may create a series of keyframes, in which case the system automatically creates the intermediate frames to produce a linear animation sequence. In such systems the process of creating an animation sequence is slow and expensive due to the need to employ a skilled animator to create the frames or keyframes.

Alternative computer animation systems have therefore been proposed in which animation sequences can be produced by a user controlling a virtual environment interactively and by extensive re-use of pre-existing animations stored within the system. In such systems, a virtual environment is created which may be populated by avatars, props and other objects. Animations are made available which determine the way in which the objects move in the virtual environment. These may be imported directly from motion capture rigs, created in other 3D-animation packages or exist in the library of motions included with the software. By controlling the virtual environment, a user can build up an animation sequence for later replay or editing.

Interactive virtual environments are also used in many computer games. Such games usually display a virtual world populated by characters and other objects. The characters may move through the virtual world and perform actions such as picking up an object. In such games animation sequences are created in response to a user's input, but no provision is made to save the animation sequence for replay or for editing.

A problem which arises when creating an interactive virtual environment is that, due to its interactive nature, it is difficult to ensure that the integrity of the environment will be maintained in all possible situations. This problem is usually overcome by predicting all possible situations which may arise, and ensuring that an animation is available for each situation. For example, a character entering a room may need to interact with an object within the room. The designer will then need to create a bespoke animation for the character to go to each potential place where the object might be. The complexity of such animations and workload involved in creating them mean that only a small set of possible options are normally created for a given situation. The animations give the impression of free choice but, in fact, a tree structure of options is worked through.

If an object or choice within a scene was not considered by the designers of the scene then the environment may crash or fail to allow the user to continue as there is no pre-determined way for the user to get to the object, make the choice etc.

Interaction with objects also introduces complexity in terms of the number of potential objects. For example, if an avatar is able to pick up and put down a prop, then the system must be able to cope with the avatar both with and without the prop. This is traditionally done by predicting all possible combinations of objects which may arise, and ensuring that an animation is available for each possible combination. This can be done by providing separate animations of the avatar with and without the prop and cutting from one to the other when the prop is picked up or put down. Such an arrangement requires a large amount of animation to be produced in advance and stored ready for use. Furthermore the need to animate all possible combinations of objects in advance limits the number of objects that can be linked.

Alternatively a bit map image of the prop may be overlaid on the avatar when the avatar picks up the prop. In this case the appearance of the avatar is altered so that it appears as a combination of the avatar and the prop. The prop and the avatar movement need to be coordinated so that the interaction with the prop appears realistic, although both prop and avatar are actually having their movements controlled separately within the system. This arrangement has the disadvantage that it is difficult to maintain the integrity of the environment, as the system has to include provision for remembering the positioning of all the props and ensuring they are only interacted with in positions that have animations created for that position.

SUMMARY OF THE INVENTION

According to a first aspect of the present invention there is provided apparatus for controlling an interactive virtual environment, the apparatus comprising means for defining a virtual environment populated by objects, the objects comprising at least avatars and props, wherein:
  objects within the virtual environment may be dynamically attached to and detached from other objects under user control; and
  a prop has associated with it an animation for use when an avatar interacts with the prop, and when the prop is attached to another object the animation remains associated with the prop.

Associating the animation with the prop in this way effectively attaches the animation to other objects together with the prop, which can help to maintain the integrity of the virtual environment. This is because the animation moves around the virtual environment together with the prop, and therefore the necessary animations for an interaction between an avatar and the prop will always be available.

Furthermore, the association of animation to the prop can allow major changes to take place in a scene without affecting the integrity of the scene. For example, if an environment were playing a scene, then a prop with an animation associated with it could be dropped into the scene and immediately all avatars would be able to interact with it because the prop in this system contains the information defining the interaction.

The term "avatar" as used herein preferably means an autonomous object, by which is preferably meant that the object can move independently, either of its own accord or under user control. An avatar is typically a character in a scene, but may also be any vehicle or other object that interacts with other avatars, objects or parts of the scenery. An avatar may be given a certain appearance and behaviour, and may be controlled by the user.

The term "prop" as used herein preferably means a non-autonomous object, by which it is preferably meant that the object can only move in dependence on another object or under user control. A prop may however have its own animations; for example a clock may have a pendulum which swings and hands which move, although the clock itself cannot move or generate interactions with other props of its own accord.

Preferably, when an object is attached to another object, it inherits the movement of the object to which it is attached. By allowing objects to be dynamically attached and detached to other objects, and arranging for an object that is attached to another object to inherit the movement of that object, it is possible for one object to be carried by another object without having to provide separate animations for that combination of objects in advance or separate coordination of the movement of the carried object. This leads to a much more flexible system in which it is not necessary to predict all possible combinations of objects and placements in advance.

The apparatus may further comprise means for storing an animation sequence for subsequent replay or editing, and/or the apparatus may be an apparatus for playing a computer game.

The concept of motion inheritance within an authoring tool for creating and editing animation sequences is an important aspect of the present invention which may be provided independently. Thus, according to a second aspect of the present invention there is provided an apparatus for controlling an interactive virtual environment, the apparatus comprising:

means for defining a virtual environment populated by objects;

means for allowing a user to control the virtual environment to create an animation sequence; and means for storing an animation sequence for subsequent replay or editing;

wherein objects within the virtual environment may be dynamically attached to and detached from other objects, and when an object is attached to another object it inherits the movement of the object to which it is attached.

In the second aspect of the invention the objects may comprise at least avatars and props. A prop may have associated with it an animation for use when an avatar interacts with the prop.

The concept of associating an animation with a prop in an authoring tool is another important feature of the present invention which may also be provided independently. Thus, according to a third aspect of the invention there is provided apparatus for controlling an interactive virtual environment, the apparatus comprising:

means for defining a virtual environment populated by objects, the objects comprising at least avatars and props;

means for allowing a user to control the virtual environment to create an animation sequence; and means for storing an animation sequence for subsequent replay or editing;

wherein a prop has associated with it an animation for use when an avatar interacts with the prop.

Preferably, when the prop is attached to another object, the associated animation remains associated with the prop.

In any of the above aspects, the animation which is associated with the prop may be an animation defining the movement of the avatar, or an animation defining the movement of the prop. Where appropriate, the prop may have associated with it an animation defining the movement of the prop and an animation defining the movement of the avatar when the avatar interacts with the prop. For example opening a door requires an animation for the prop (the door) and a coordinated animation for the avatar (opening the door). The combination of both animations provides the impression that the avatar is opening the door. In other circumstances only an avatar animation or only a prop animation is necessary; for example turning on a television might have a motion for the avatar but not for the television itself, since the television does not move.

When an avatar interacts with the prop, the avatar may query the prop for the avatar animation associated with the prop.

The animation or animations may be defined as part of a state machine associated with the prop. The state machine may comprise a state transition which defines an initial state, a final state, and at least one of a prop animation which takes the prop from the initial state to the final state, and an avatar animation which takes the avatar from the initial state to the final state, and possibly back to the initial state. In many situations both a prop animation and an avatar animation will be provided. However, where either the prop or the avatar does not move during an interaction, then no animation need be provided for that object. For example, if the prop is a staircase, then the avatar animation may define the movement of the avatar up or down the staircase, but no prop animation need be provided. The state machine may comprise a plurality of state transitions each of which defines one way in which an avatar interacts with the prop.

A precondition may be associated with one of the states. Such a precondition may require an avatar to perform one action before another action is performed, as the precondition defines that a prop must be in a certain state before another action is carried out. This can allow relatively complex and flexible sequences to be built up as the current state of props and any preconditions define how the avatar will interact with the props, allowing sophisticated chains of movement to be built up using simple commands.

The state machine may have an idle state. The idle state may be a state into which an avatar enters following a particular action. There may also be an action which takes the avatar out of the idle state, and the avatar may be required to perform this action before any further action is performed. This arrangement can also allow relatively complex behaviours to be built up.

An animation sequence may be stored as a script comprising a list of commands. Such commands may be the same commands as may be entered by a user in order to control the virtual environment. This may provide a convenient way of storing complex behaviours, which is easily understood by a user.

The script may be typed in by the user through a script window, or the script may be created by recording the commands which a user types in while controlling the virtual environment. Scripts may be nested, and scripts may call other scripts. This can allow complex behaviours to be built up using behaviours that have already been created.

A script may contain an instruction which is to be passed to an object in the virtual environment. The apparatus may be arranged such that the instruction is only passed to the object once an animation which precedes it in the script has been played out. This can help to ensure that the integrity of the environment is maintained, by ensuring that an animation which is in progress is completed before another animation starts.

An animation sequence may also be built up using first person control of the avatars. This uses keyboard buttons and/or the mouse to control the movement of the avatar in the environment and its interaction with other avatars and props. This can be recorded and then replayed with further motions or interactions being overlaid on the existing motions and interactions recorded previously. This layered animation can be saved and called from within a script creating a hybrid of script and first person control based animation.

An avatar may comprise at least a file defining its appearance, and an animation defining its movements. A plurality of avatars may share a common animation. Such an animation may be either an animation which is associated with the avatar, or an animation which is associated with another object such as a prop. This can increase the flexibility of the system and reduce the amount of animation that needs to be created. Where the avatars are different sizes, or where the common animation has been created for an avatar which is a different size, the common animation may be retargeted to fit the size of the avatar in question.

A prop may include a file which specifies a way in which the prop may contain other props. This can allow the system to handle the situation where one prop is placed inside another while maintaining the integrity of the environment.

Corresponding method aspects are also provided, and thus according to a fourth aspect of the present invention there is provided a method of controlling an interactive virtual environment, the method comprising defining a virtual environment populated by objects, the objects comprising at least avatars and props, wherein:
  objects within the virtual environment may be dynamically attached to and detached from other objects under user control; and
  a prop has associated with it an animation for use when the prop interacts with an avatar, and when the prop is attached to another object the associated animation remains associated with the prop.

According to a fifth aspect of the present invention there is provided a method of controlling an interactive virtual environment, the method comprising the steps of:
  defining a virtual environment populated by objects, wherein objects may be dynamically attached to and detached from other objects;
  allowing a user to control the virtual environment to create an animation sequence; and
  storing an animation sequence for subsequent replay or editing;
  wherein when an object is attached to another object it inherits the movement of the object to which it is attached.

According to a sixth aspect of the invention there is provided a method of controlling an interactive virtual environment, the method comprising:
  defining a virtual environment populated by objects, the objects comprising at least avatars and props;
  allowing a user to control the virtual environment to create an animation sequence;
  storing an animation sequence for subsequent replay or editing; and
  associating with a prop an animation for use when an avatar interacts with the prop.

The invention also provides a computer program which, when run on a computer, causes the computer to carry out the method of any of fourth to sixth aspects, or to become the apparatus of any of the first to third aspects. The invention also provides a computer readable storage medium having stored thereon a computer program which, when run on a computer, causes the computer to carry out the method of any of the fourth to sixth aspects or to become the apparatus of any of the first to third aspects.

The invention may also provide apparatus for controlling an interactive virtual environment, the apparatus comprising a processor, a memory, an input device and a display device, wherein the processor is programmed such that:
  a virtual environment populated by objects is defined for display on the display device;
  a user may control the virtual environment by means of the input device to create an animation sequence and save an animation sequence in the memory for subsequent replay or editing; and
  objects within the virtual environment may be dynamically attached and detached to and from other objects, and when an object is attached to another object it inherits the movement of the object to which it is attached.

The invention may also provide apparatus for controlling an interactive virtual environment, the apparatus comprising a processor, a memory, an input device and a display device, wherein the processor is programmed such that:
  a virtual environment populated by objects is defined for display on the display device, the objects comprising at least avatars and props;
  a user may control the virtual environment by means of the input device to create an animation sequence and save an animation sequence in the memory for subsequent replay or editing; and
  a prop has associated with it an animation for use when the prop interacts with an avatar.

The invention may also provide apparatus for controlling an interactive virtual environment, the apparatus comprising a processor, a memory, an input device and a display device, wherein the processor is programmed such that:
  a virtual environment populated by objects is defined for display on the display device, the objects comprising at least avatars and props;
  objects within the virtual environment may be dynamically attached and detached to other objects under user control, and when an object is attached to another object it inherits the movement of the object to which it is attached; and
  a prop has associated with it an animation for use when an avatar interacts with the prop, and when the prop is attached to another object the associated animation remains associated to the prop.

Features of any of the above aspects may be applied to any of the other aspects. Apparatus features may be applied to the method aspects and vice versa.

Preferred features of the present invention will now be described, purely by way of example, with reference to the accompanying drawings, in which:—

DETAILED DESCRIPTION OF THE INVENTION

Overview of an Editing Apparatus

Figure 1:
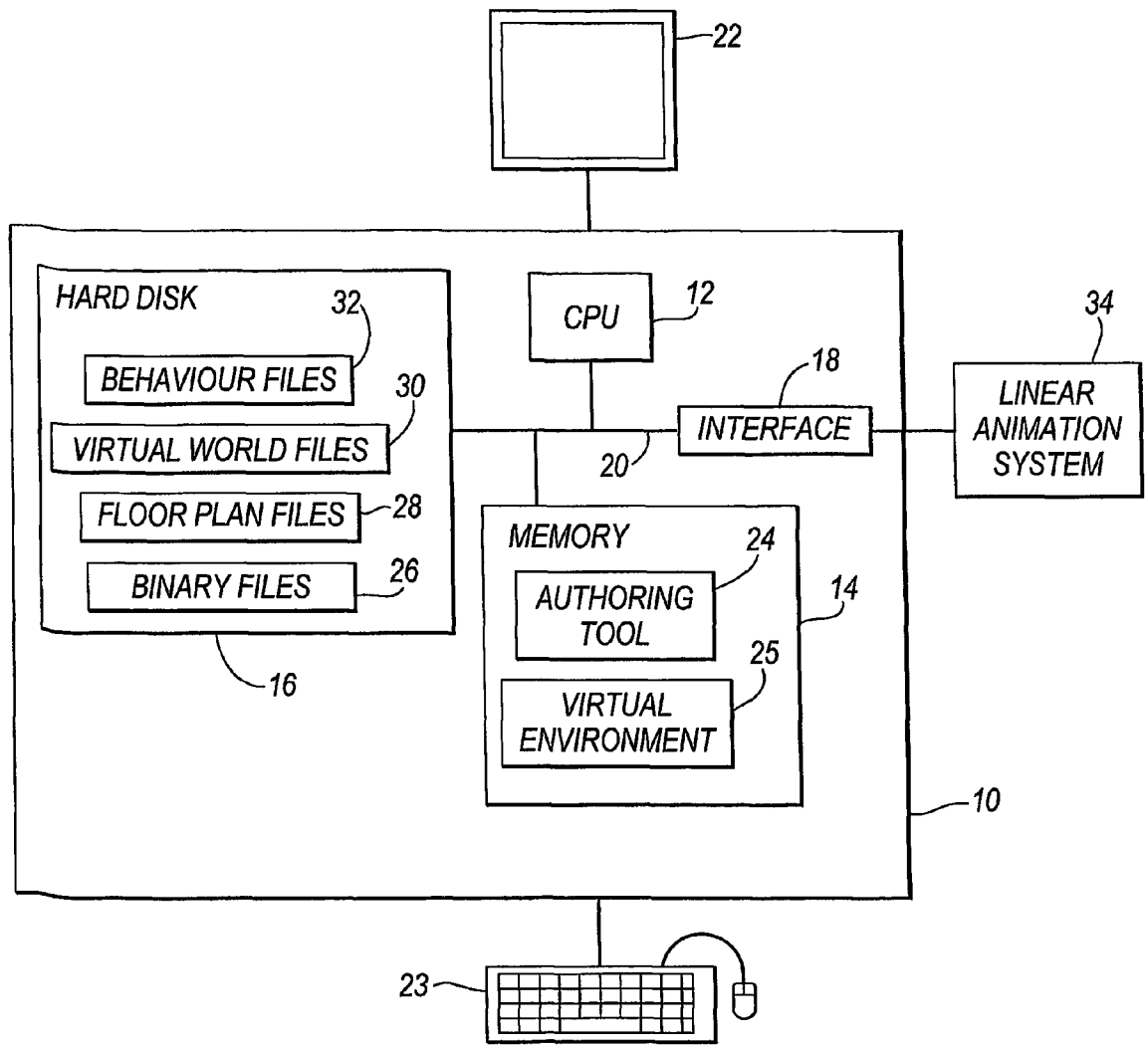
FIG. 1 shows an editing apparatus according to an embodiment of the present invention.

FIG. 1 of the accompanying drawings shows an editing apparatus 1 according to an embodiment of the present invention. In this embodiment the editing apparatus is implemented using a suitably programmed general purpose computer. Referring to FIG. 1, computer 10 comprises central processing unit (CPU) 12, solid state memory 14, hard disk 16, interface 18 and bus 20. The memory 14 stores an authoring tool program 24 for execution by the CPU 12 and data representing a virtual environment 25. The hard disk 16 stores four different types of files, namely binary files 26, floor plan files 28, virtual world files 30 and behaviour files 32. The computer 10 is connected to an external display 22 and an input device 23 such as a keyboard and/or mouse. The computer 10 is also connected to linear animation system 34.

The binary files 26 are files which contain low level geometric and animated data, arid the floor plan files 28 are files which represent the floor plan of the virtual environment. In the present embodiment, the binary files 26 and the floor plan files 28 are created by the linear animation system 34 and exported to the editing apparatus 1. The binary files 26 and the floor plan files 28 are then used as building blocks by the editing apparatus to create an interactive virtual environment. The virtual world files 30 are text files which are created by the editing apparatus 1 and which define the virtual world. The behaviour files 32 are also created by the editing apparatus 1, and are text files that script the behaviour of the virtual world.

Linear animation system 34 may be, for example, 3D Studio Max (trademark) which is supplied by the company Discreet of the United States, or any other suitable system for producing geometric and animated data. Such linear animation systems are known in the art and accordingly a detailed description thereof is omitted. While in FIG. 1 the linear animation system 34 is shown as being external to the computer 10, it may be implemented as a program which is run on the computer 10. In that case the linear animation system 34 can save the binary files 26 and the floor plan files 28 directly to the hard disk 16.

It will be appreciated that the arrangement of FIG. 1 is given as an example only and that other arrangements may be used to carry out the present invention. For example, some or all of the files 26 to 32 may be stored in memory 14, and some or all of the program 24 may be stored in the hard disk 16. Other types of storage media such as optical storage media may be used as well as or instead of hard disk 16. While FIG. 1 shows a general purpose computer configured as an editing apparatus, embodiments of the present invention may be implemented using a dedicated editing apparatus.

Creating a Virtual Environment

Figure 2:
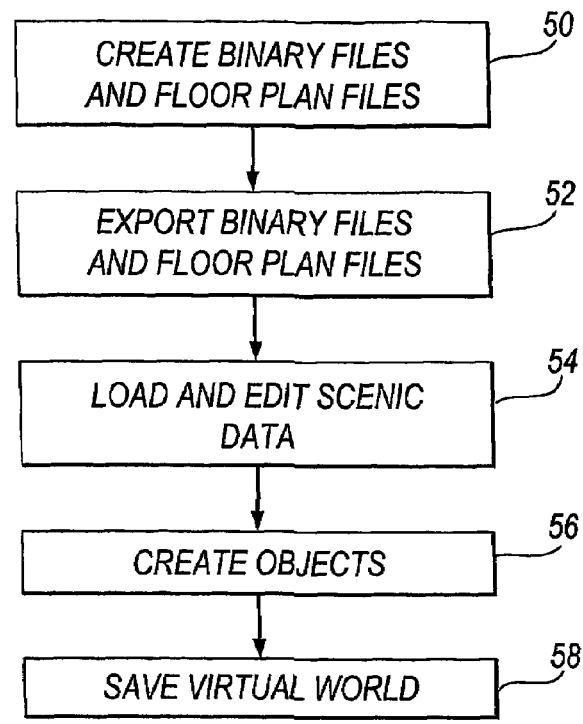
FIG. 2 shows an example of the steps which may be taken in order to create a virtual environment.

FIG. 2 shows an example of the steps which may be taken in order to create a virtual environment. In step 50, binary files 26 and floor plan files 28 are created by linear animation system 34. The binary files 50 may contain various types of data, such as:
 rigid geometry
 rigid morph geometry
 skinned geometry
 skinned morph geometry
 keyframe
 animation
 vertex animation
 morph animation The floor plan files are text files which represent the floor plan of a room.

In step 52 the binary files and floor plan files are exported to the editing apparatus 1. As a result of this step, binary files 26 and floor plan files 28 are stored on hard disk 16.

In step 54 the editing apparatus 1 loads and edits scenic data which defines the appearance of the virtual environment. This is done by loading the required floor plan files 28 and/or binary files 26 from the hard disk 16 and storing them in memory 14. The scene defined by the scenic data is displayed on the display 22, and the user can modify the scene as required through input device 23.

In step 56 objects are created which populate the virtual world defined by the scenic data. The objects may be avatars, props, sounds, camera, lights or any other objects. The objects are created by loading the required binary files 26 from the hard disk 16 and storing them in memory 14. As the objects are created, the relationship between the various objects (if any) is also defined. The relationship of all objects to each other is known as the scene hierarchy, and this scene hierarchy is also stored in memory 14.

Once steps 50 to 56 have been completed, a virtual environment populated by objects such as avatars and props has been created. In step 58 this virtual environment is saved as a set of virtual world files 30 on the hard disk 16.

While steps 50 to 56 are shown as taking place sequentially in FIG. 2, in practice the process of building up a virtual world is likely to involve several iterations of at least some of the steps in FIG. 2.

Figure 3:
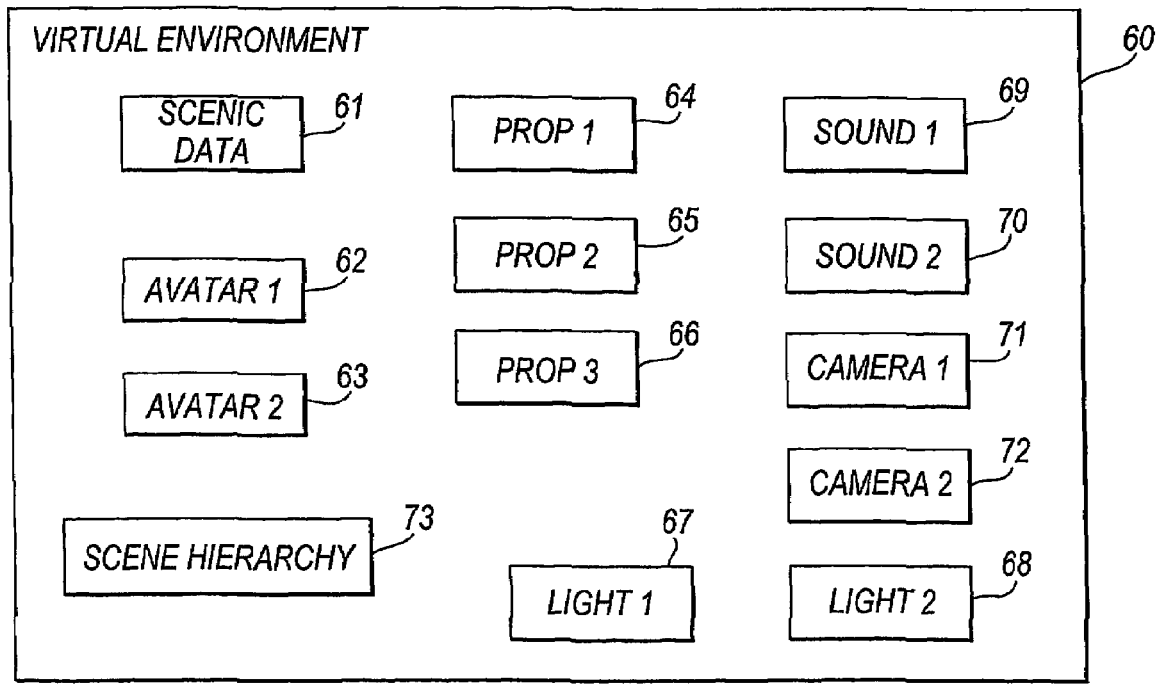
FIG. 3 shows an example of the various components that may make up a virtual environment.

FIG. 3 shows an example of the various components that may make up a virtual environment. In this example, the virtual environment 60 comprises scenic data 61, two avatars 62, 63, three props 64, 65, 66, two lights 67, 68, two sounds 69, 70, two cameras 71, 72 and scene hierarchy data 73. The files which make up the virtual environment 60 are usually stored in memory 14, which allows those files to be accessed as quickly as possible. However memory 14 may instead contain pointers to the relevant files in hard disk 16. This may be done, for example, for files which are rarely used, or if there is insufficient space in memory 14.

Figure 4:
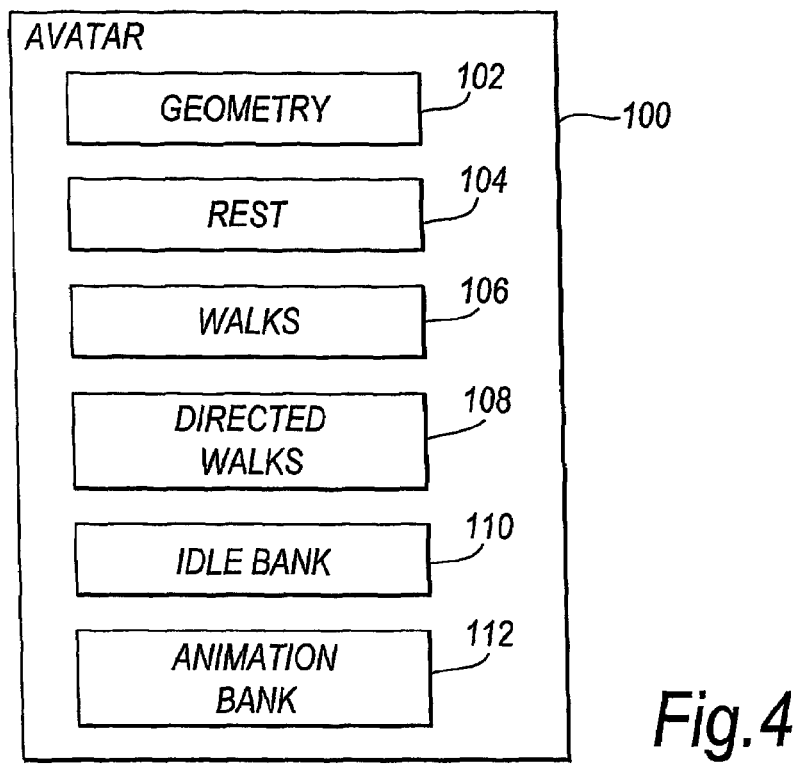
FIG. 4 shows an example of the composition of an avatar.

FIG. 4 shows an example of how an avatar, such as one of the avatars 62, 63 in FIG. 3, is constructed. Referring to FIG. 4, avatar 100 is made up of geometry file 102, rest file 104, walks file 106, directed walks file 108, idle bank 110 and animation bank 112. Each of these files is loaded from the hard disk 16 in response to an instruction from the user, or else a pointer to the appropriate file on the hard disk is created.

The geometry file 102 is a binary file which defines the geometry of the avatar. More than one geometry file can be defined should it be required to change the geometry of the avatar. The rest file 104 is a keyframe of the avatar in the rest state, and is also a binary file. The walks file 106 is a binary file containing animations of the avatar walking. The directed walks file 108 contains animations which can be used to allow a user to control the movement of the avatar, for example by means of the cursor control keys on the keyboard. The idle bank 110 is a set of animations which the avatar can use when in the rest state, for example, a set of animations which are appropriate for the avatar when it is standing still. The animation bank 112 is a set of animations which the avatar uses to perform various actions.

Figure 5:
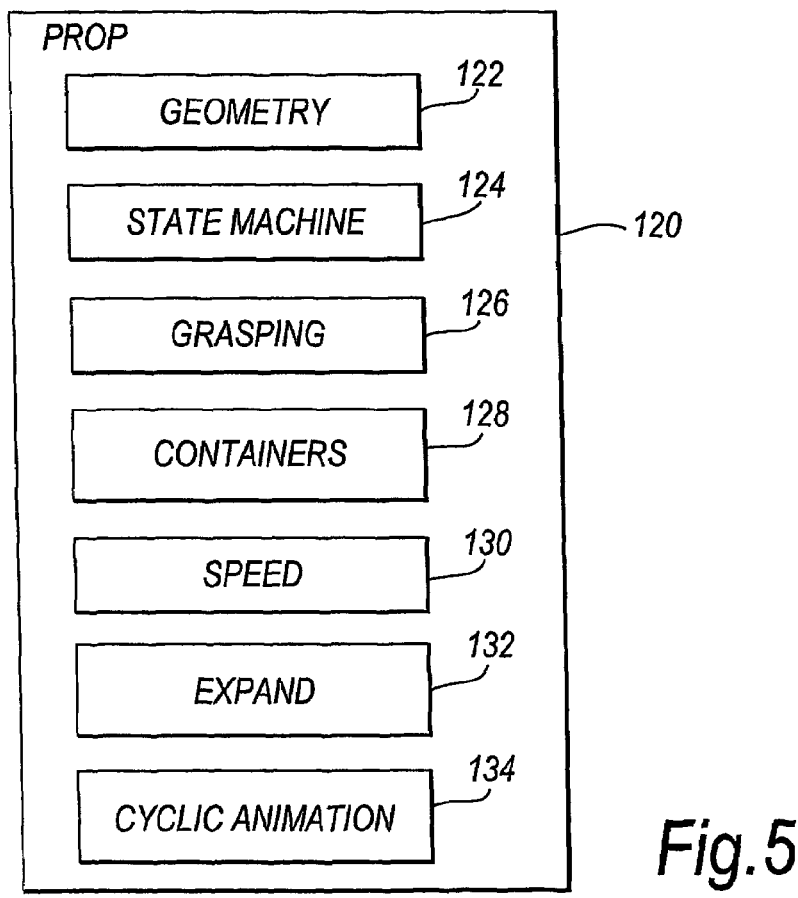
FIG. 5 shows an example of the composition of a prop.

FIG. 5 shows an example of how a prop, such as one of the props 64, 65, 66 in FIG. 3, is constructed. Referring to FIG. 5, prop 120 comprises geometry file 122, state machine 124, grasping file 126, containers file 128, speed file 130 and expand file 132.

The geometry file 122 is a binary file which defines the geometry of the prop. The state machine 124 defines how the prop interacts with avatars. The grasping file 126 is one or more keyframe consisting of an avatar attached to the prop, frozen at the instant in time when the avatar is picking up the prop. The speed file 130 specifies the speed with which the prop may move over the floor plan. The expand file 132 defines the expansion or contraction of the projection of the prop on the floor plan. The cyclic animation file 134 contains animations which may be used to animate the prop as it moves.

The containers file 128 specifies the ways in which a prop may contain other props. This file holds a list of floor plan files. Each floor plan file represents a surface on the prop that an avatar uses to position other props. The prop keeps track of what it contains and what it can contain and instructs the avatar accordingly.

Sounds, lights, cameras and other objects can be created by the editing tool 1 in a similar way.

All objects can be copied and pasted. Wherever appropriate copied objects share geometry and animations (i.e instances of the objects are created). When copying and pasting multiple objects the relationships between those objects are also cloned. For example, a single house may be built into an apartment block, and if an avatar can navigate itself around the house then it will automatically be able to navigate about the apartment block.

In the editing apparatus 1 of FIG. 1, different avatars of different sizes and different topologies all share a common pool of animations. An animation for one particular avatar can be retargeted to a different avatar. For example, a plurality of different avatars going up a set of stairs can all share the same animation associated with the stairs.

When an avatar plays an animation, that animation is retargeted to fit the avatar in question. This is done by extrapolating the animation so that the nodes of the avatar sweep out movements corresponding to those of the original animation, but increased or decreased in magnitude so as to fit the size of the avatar. This technique is known as motion retargeting. If motion retargeting was not used, it would be necessary to provide a separate animation for each avatar.

Controlling a Virtual Environment

The virtual environment which is created in the way described above is an interactive virtual environment which can be controlled by a user. This is done by displaying a graphical user interface on the display 22 of FIG. 1, via which commands can be entered by means of input device 23. An example of such a graphical user interface is shown in FIG. 6.

Figure 6:
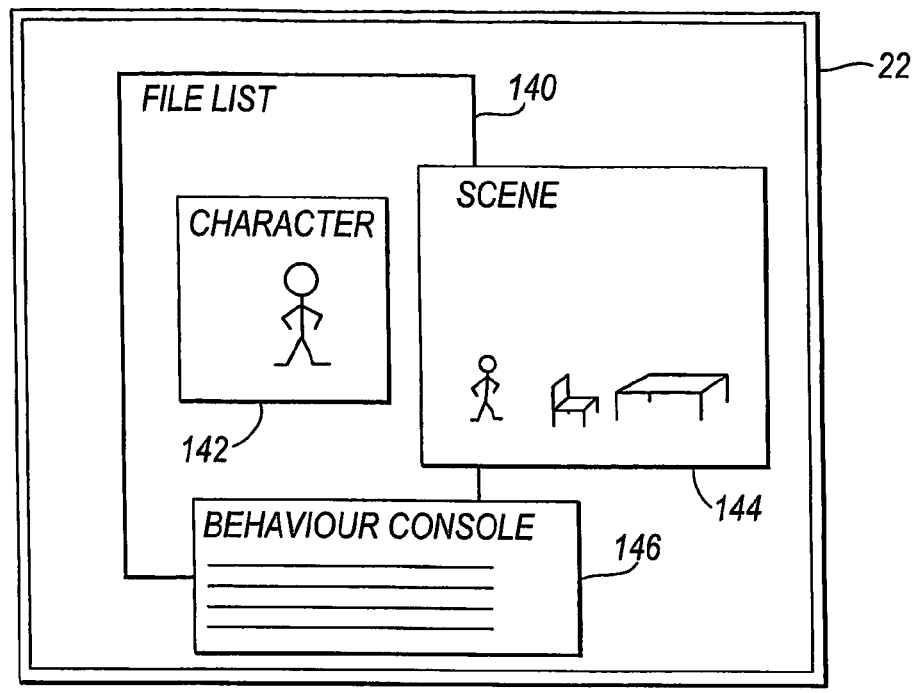
FIG. 6 shows an example of a graphical user interface produced by the editing apparatus of FIG. 1.

In the example shown in FIG. 6, four windows are displayed, namely a file list window 140, a character window 142, a scene window 144 and a behaviour console 146. The file list window 140 lists files stored in one or more directories on the hard disk 16. The character window 142 shows a view of the avatar that is being controlled. The scene window 144 shows a scene which is being edited and which may contain the avatar shown in the character window 142. The behaviour console 146 is used to input commands via input device 23. It will be appreciated that other windows may also be present, and that windows may be opened or closed as required.

The editing apparatus 1 uses a scripting language which gives the user high-level control over objects within a scene. When creating the behaviour of the virtual world, the user types in commands through the behaviour console. For example, commands may be typed in which:

direct objects in the scene
add or remove objects
attach or detach objects to or from other objects
hide or unhide objects
query the scene for information.

All of the commands in the scripting language are dynamic, and can be invoked at any time during a simulation.

Once the user is satisfied with the results, behaviours are encapsulated by grouping commands into behaviour files 32 which are stored on hard disk 16. With the exception of query commands, any commands which can be input through the behaviour console can also be put into a behaviour file. These behaviour files are also known as scripts.

Behaviour files can be created either by typing in a list of commands though a behaviour script window, or else by recording the action which takes place in a scene. Action in a scene can be recorded through the use of a record button which is part of the graphical user interface displayed on display 22. Action can be recorded either through the scene's view window, or else through a camera's view window. While record button is activated all action that takes place in the virtual environment is automatically saved to disk. The thus recorded action can be converted into an animation file such as an AVI file either immediately or at a later stage.

Complex behaviours can be achieved by running many behaviour files concurrently. Behaviour files can be nested. Behaviour files can also control when other behaviour files get invoked or discarded (so-called meta-behaviours).

Complex motion can be built up along the timeline by concatenating animation clips from separate sources and blending between them ("motion chaining").

Dynamic Hierarchy Switching

Objects which make up the virtual environment have a scene hierarchy. If an object is the child of another object then it inherits that object's motion. For example, if a prop is being carried by an avatar, then the prop inherits the motion of the avatar.

Dynamic hierarchy switching occurs when an object changes its parent from one object to another. For example, if a prop is given by one avatar to another, then the prop changes its parent from the first avatar to the second.

Figure 7A:
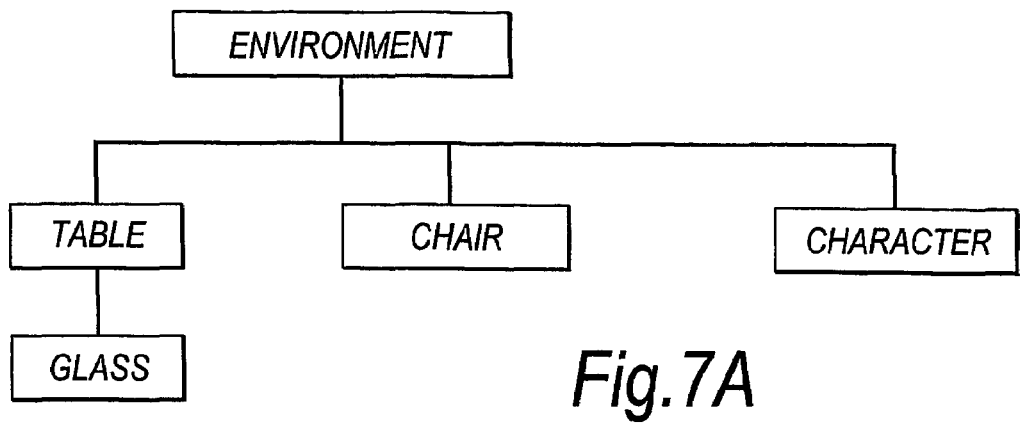
FIGS. 7A to 7C show examples of scene hierarchies.
Figure 7B:
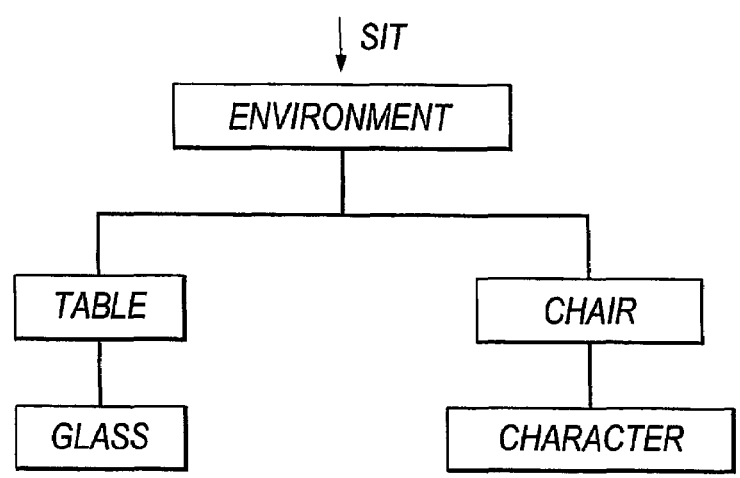
Figure 7C:
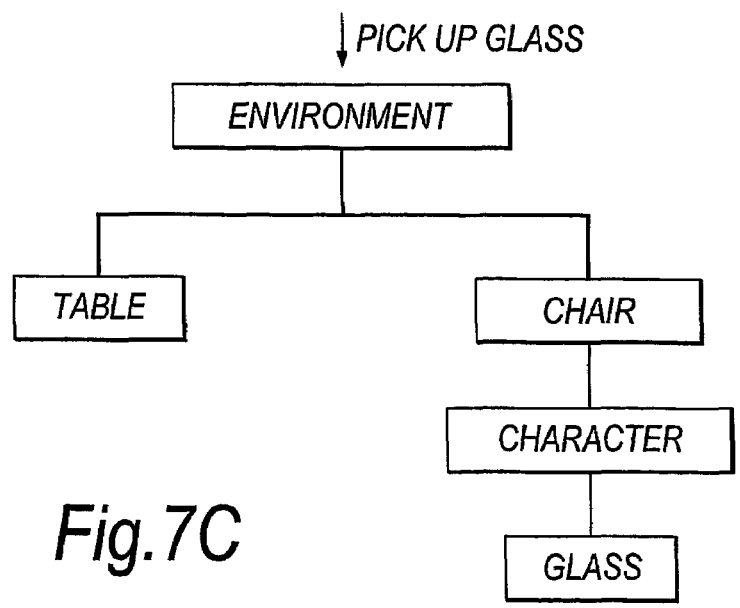

FIGS. 7A to 7C show examples of scene hierarchies. In these figures the scene is populated by one avatar and three props. The avatar is a character and the three props are a table, a chair and a glass.

In FIG. 7A it is assumed that the character, the table and the chair are all located independently of each other. These objects thus have only the environment as their parent, and so their movement is not dependent on the movement of any other object. It is also assumed that the glass is located on the table. FIG. 7A therefore shows the glass with the table as its parent. Because of this parent/child relationship, when the table moves, the glass will move with it.

FIG. 7B shows the scene hierarchy which may occur if the character sits on the chair. This action may be carried out, for example, in response to a "sit" command which is issued by the user through the behaviour console. In FIG. 7B the character is now the child of the chair, which means that if the chair should move then the character will move with it.

FIG. 7C shows the scene hierarchy which may occur if the character picks up the glass from the table. In moving from FIG. 7B to FIG. 7C, the glass dynamically switches its hierarchy so that it is now the child of the character, which is itself the child of the chair. The glass will therefore move in dependence on the movement of the character, which movement may itself depend on the movement of the chair.

Dynamic hierarchy switching allows complex movements to be built up in which objects interact with each other in a way which appears natural. Without dynamic attachment it would be necessary to provide separate animations for all anticipated situations where the movement of one object was dependent on that of another object.

An avatar is made up of a series of nodes which are linked in a node hierarchy to form a skeleton. In a simple case an avatar may have a node hierarchy consisting of two hands, two feet and a head node; in more complex cases the node hierarchy may include nodes for shoulders, elbows, fingers, knees, hips, eyes, eyelids, etc.

When an avatar picks up a prop, the prop becomes attached to one of the nodes in the avatar's node hierarchy. For example, if an avatar grasps a bottle in its right hand, then the bottle becomes attached to the right hand node. However, since the avatar will usually occupy a certain volume around its nodes, the prop is not attached directly to the node, but rather, a certain distance is defined from the node to the prop corresponding to the volume occupied by the avatar at the point of attachment. In addition the orientation of the prop relative to the node is defined. The distance and orientation of the prop relative to the node are then stored.

Once a prop has become attached to an avatar, the prop inherits movements of the node to which it is attached. For example, if the avatar plays out an animation, then the movements of each of the nodes will be defined by the animation. The movement of the prop can then be determined, taking into account the distance of the prop from the node and its orientation.

A prop can be attached to any one or more of an avatar's nodes; for example an article of clothing may be attached to several nodes. In addition props which define the avatar's appearance can be attached to the avatar; for example eyes, ears or a nose can be attached to the avatar in this way.

Other objects can be attached to each other in a similar way.

Intelligent Props

In the editing apparatus 1 of FIG. 1, the way in which an avatar interacts with a prop is defined by a state machine which is associated with the prop. The state machine contains one or more animations which are used to take the avatar and the prop from one state to another. When an avatar interacts with a prop, the avatar queries the prop for the animations that the avatar is to perform.

Figure 8:
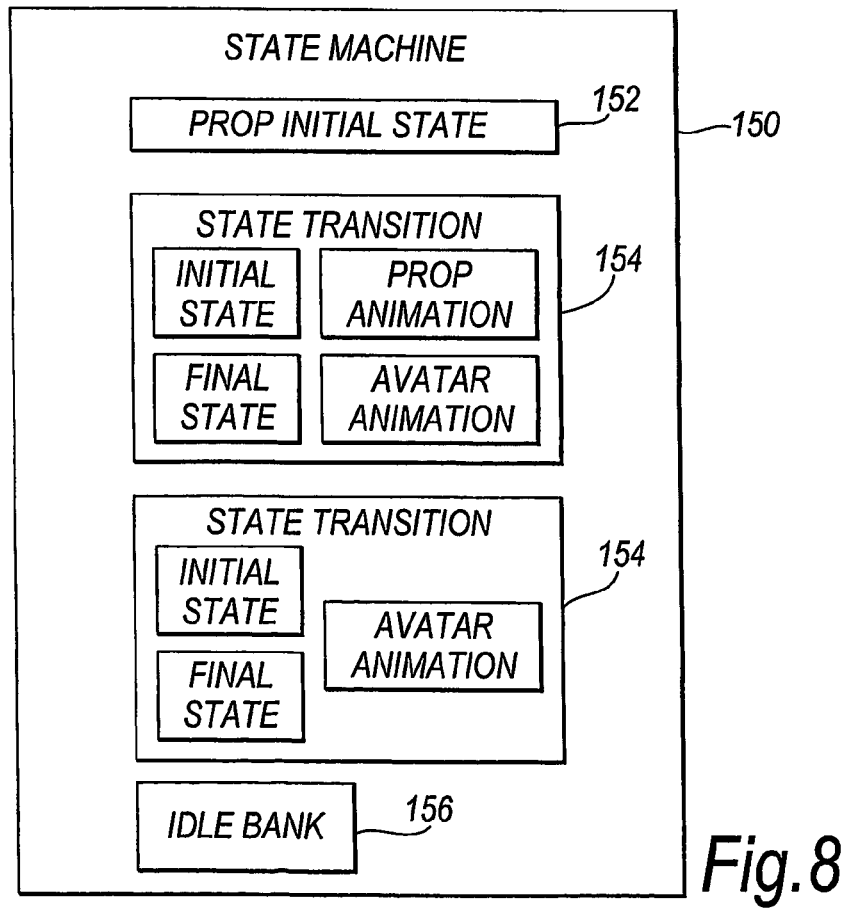
FIG. 8 shows an example of a state machine.

FIG. 8 shows an example of a state machine which is attached to a prop. In FIG. 8, state machine 150 comprises prop initial state 152, state transitions 154, 156 and idle bank 158. The prop initial state 152 defines the initial state of the prop, and all animations in the state machine are imported relative to the prop in this initial state. This is done to ensure that all animations are compatible with the environment.

Each of the state transitions 154, 156 defines the way in which a prop and an avatar are taken from one state to another when they interact. In general, a state transition specifies an initial state and a final state, and contains an avatar animation and a prop animation which take the avatar and the prop from the initial state to the final state. However, where either the prop or the avatar does not move during an interaction, one of the animations may be omitted. In the most simple case an avatar interacts with a prop in the same way every time and leaves the prop exactly as it finds it. In this case the prop has only one state and there is no state transition as such.

The idle bank 158 defines animations which can be carried out by an avatar when the avatar is interacting with the prop and is in an idle state.

When an avatar interacts with a prop it queries the prop for the avatar animation. The avatar is then animated with the avatar animation while the prop is animated with the prop animation.

The state machine 150 is associated kinematically with the prop. This means that the state machine is attached to the prop and as the prop moves so does the state machine. Associating the state machine with the prop in this way decentralizes control of the animation and leads to a very open architecture. For example a user may introduce his own prop into the environment and, as long as the state machine for the prop is correctly set up, that prop will be able to interact with the rest of the environment.

When the prop's hierarchy changes, that is, when the prop switches its parent from one object to another, the state machine associated with that prop also changes its hierarchy in the same way. Changing the state machine's hierarchy together with the prop's helps to maintain the integrity of the virtual environment. This is because the necessary animations for an interaction between an avatar and the prop will always be available, and those animations will always depend on the relationship of the prop to other objects.

Props with state machines can have preconditions applied to states. If an avatar is given a command that will result in a prop transitioning to a certain state and this state has preconditions specified, then the avatar will attempt to satisfy the preconditions before executing the command. In this way relatively complex behaviours can be generated by combining a few props and their state machines.

For example, a precondition might be that an avatar cannot put a bottle into a fridge unless the fridge door is open. In this case, if the avatar is asked to perform the action of putting the bottle into the fridge, it will first attempt to open the fridge door.

A state machine may have an idle state. State machines with idle states are used when there is a transition required to start the interaction, whereupon the prop goes into the idle state, and a transition to end the interaction, which takes the prop out of its idle state. If an avatar is given a command but is already in the idle state with respect to another prop then the system will attempt to take this prop out of its idle state before executing the command.

For example, if an interaction involves an avatar going to bed, then an animation may be played that starts with the avatar standing by the bed and ends with it lying on the bed. The state of the avatar lying on the bed may be specified as an idle state. In this state the idle bank for the avatar may contain animations, for example, corresponding to different sleeping movements. If the avatar is then instructed to interact with another object elsewhere, it must first get out of bed. This will happen automatically if there is a transition corresponding to it getting out of bed whose initial state is set to the idle state.

Deferred Message Passing

Avatars can communicate with other avatars and affect each other's behaviours thorough message passing. Before an avatar can communicate with another avatar, it must connect itself to the avatar with which it wishes to communicate. This is done through a specified message, which can be named in any way. The connection is viewed as a tag inside the software When an avatar emits a message, all avatars listen to the message, but only those avatars which are connected to the avatar emitting the message will receive the message and process it.

Objects in the environment are made to move by building and linking together chains of animations that get played out by each object individually. These animation chains can be cut and spliced together.

Instructions can be placed between the joined chains, which instructions can fire messages to other objects in the system. These messages only get fired after the animations that precede them get played out. This is referred to as deferred message passing. Deferred message passing can force a dynamic switch in the scene hierarchy.

The invention claimed is:

1. Apparatus for controlling an interactive virtual environment, the apparatus comprising a unit which defines a virtual environment populated by objects, the objects comprising avatars and props, wherein objects within the virtual environment may be dynamically attached to and detached from other objects, characterized in that one or more of the props has associated with it information defining one or more animations which may be performed by an avatar when said avatar interacts with the prop, the avatar being operable to query the prop for the information defining the animation that the avatar is to perform when the avatar interacts with the prop, and wherein when the prop is dynamically attached to another object, the information defining the animation(s) to be performed by one or more of the avatars during an interaction with the prop, remains associated with the prop.

2. Apparatus according to claim 1 wherein when an object is attached to another object, it inherits the movement of the object to which it is attached.

3. Apparatus according to claim 1, further comprising a unit which stores an animation sequence for subsequent replay or editing.

4. Apparatus according to claim 3, further comprising: a unit which allows a user to control the virtual environment to create an animation sequence.

5. Apparatus according to claim 3, wherein an animation sequence is stored as a script comprising a list of commands.

6. Apparatus according to claim 5 wherein the commands are the same commands as may be entered by a user in order to control the virtual environment.

7. Apparatus according to claim 5, wherein a script contains an instruction which is to be passed to an object in the virtual environment.

8. Apparatus according to claim 7 wherein the instruction is only passed to the object once an animation which precedes it in the script has been played out.

9. Apparatus according to claim 1, being an apparatus for playing a computer game.

10. Apparatus according to claim 1, wherein the animation or animations are defined as part of a state machine which is associated with the prop.

11. Apparatus according to claim 10 wherein the state machine comprises a state transition which defines an initial state, a final state, and at least one of a prop animation which takes the prop from the initial state to the final state, and an avatar animation which takes the avatar from the initial state to the final state, and optionally back to the initial state.

12. Apparatus according to claim 11 wherein precondition is associated with one of the states.

13. Apparatus according to claim 10, wherein the state machine has an idle state.

14. Apparatus according to claim 1, wherein an avatar comprises at least a file defining its appearance, and an animation defining its movements.

15. Apparatus according to claim 1, wherein a plurality of avatars share a common animation.

16. Apparatus according to claim 15 wherein the common animation is retargeted to fit the size of the avatar in question.

17. Apparatus according to claim 1, wherein a prop includes a file which specifies a way in which the prop may contain other props.

18. A computer readable storage medium having stored thereon a computer program which, when run on a computer, causes the computer to become the apparatus according to claim 1.

19. A method of controlling an interactive virtual environment, the method comprising defining a virtual environment populated by objects, the objects comprising avatars and props, wherein:

objects within the virtual environment may be dynamically attached to and detached from other objects, characterised in that one or more of the props has associated with it information defining one or more animations which may be performed by an avatar when said avatar interacts with the prop, the avatar being operable to query the prop for the information defining the animation that the avatar is to perform when the avatar interacts with the prop, and wherein when the prop is dynamically attached to another object, the information defining the animation(s) to be performed by one or more of the avatars during an interaction with the prop, remains associated with the prop.

20. A method of controlling an interactive virtual environment according to claim 19, the method comprising the further steps of:

allowing a user to control the virtual environment to create an animation sequence; and storing an animation sequence for subsequent replay or editing.

21. A computer readable storage medium having stored thereon a computer program which, when run on a computer, causes the computer to carry out the method of claim 19.

22. Apparatus for controlling an interactive virtual environment, the apparatus comprising means for defining a virtual environment populated by objects, the objects comprising avatars and props, wherein objects within the virtual environment may be dynamically attached to and detached from other objects, characterized in that one or more of the props has associated with it information defining one or more animations which may be performed by an avatar when said avatar interacts with the pump, the avatar being operable to query the prop for the information defining the animation that the avatar is to perform when the avatar interacts with the prop and wherein when the prop is dynamically attached to another object, the information defining the animation(s) to be performed by one or more of the avatars during an interaction with the prop, remains associated with the prop.

* * * * *